(12) United States Patent
Fu et al.

(10) Patent No.: US 11,199,703 B2
(45) Date of Patent: Dec. 14, 2021

(54) IN-VEHICLE DISPLAY SYSTEM AND VEHICLE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Jianbo Fu, Beijing (CN); Hailong Wu, Beijing (CN); Yi Dan, Beijing (CN); Dalong Mao, Beijing (CN); Yan Zhou, Beijing (CN); Haipeng Zhu, Beijing (CN); Yanlin Han, Beijing (CN); Min Ran, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 302 days.

(21) Appl. No.: 16/397,640

(22) Filed: Apr. 29, 2019

(65) Prior Publication Data
US 2020/0088996 A1    Mar. 19, 2020

(30) Foreign Application Priority Data
Sep. 13, 2018 (CN) .......................... 201811068861.8

(51) Int. Cl.
*G02B 27/01* (2006.01)
*B60K 35/00* (2006.01)
*G03H 1/24* (2006.01)

(52) U.S. Cl.
CPC .......... *G02B 27/0103* (2013.01); *B60K 35/00* (2013.01); *G03H 1/24* (2013.01);
(Continued)

(58) Field of Classification Search
CPC ............ G02B 27/0103; G02B 27/0101; B60K 35/00; B60K 2370/1529; B60K 2370/29;
(Continued)

(56) References Cited

U.S. PATENT DOCUMENTS 4,790,613 A * 12/1988 Moss .................... G03H 1/2286
340/461
2012/0099170 A1 * 4/2012 Shikii ................ G02B 27/0103
359/3

FOREIGN PATENT DOCUMENTS

CN         202929353 U    5/2013
CN         104483810 A    4/2015
(Continued)

OTHER PUBLICATIONS

Office Action dated Jun. 22, 2020 issued in corresponding Chinese Application No. 201811068861.8.

*Primary Examiner* — Jade R Chwasz
(74) *Attorney, Agent, or Firm* — Nath, Goldberg & Meyer; Joshua B. Goldberg

(57) ABSTRACT

The present disclosure provides an in-vehicle display system and a vehicle. The in-vehicle display system includes an optical fiber holographic projection portion and a holographic image display portion. The optical fiber holographic projection portion is configured to holographically project image information of a vehicle component onto the holographic image display portion, and the holographic image display portion is configured to present an original image of the vehicle component.

14 Claims, 1 Drawing Sheet

(52) U.S. Cl.
CPC .. *B60K 2370/1529* (2019.05); *B60K 2370/29* (2019.05); *B60K 2370/334* (2019.05)

(58) Field of Classification Search
CPC ........ B60K 2370/334; B60K 2370/336; G03H 1/24; G03H 2001/2231; G03H 1/22; G03H 2001/0413; G03H 1/0402; G03H 2223/16
See application file for complete search history.

(56) References Cited

FOREIGN PATENT DOCUMENTS

| | | | |
|---|---|---|---|
| CN | 105739281 | A | 7/2016 |
| CN | 205679918 | U | 11/2016 |
| EP | 1975675 | B1 | 4/2016 |

\* cited by examiner

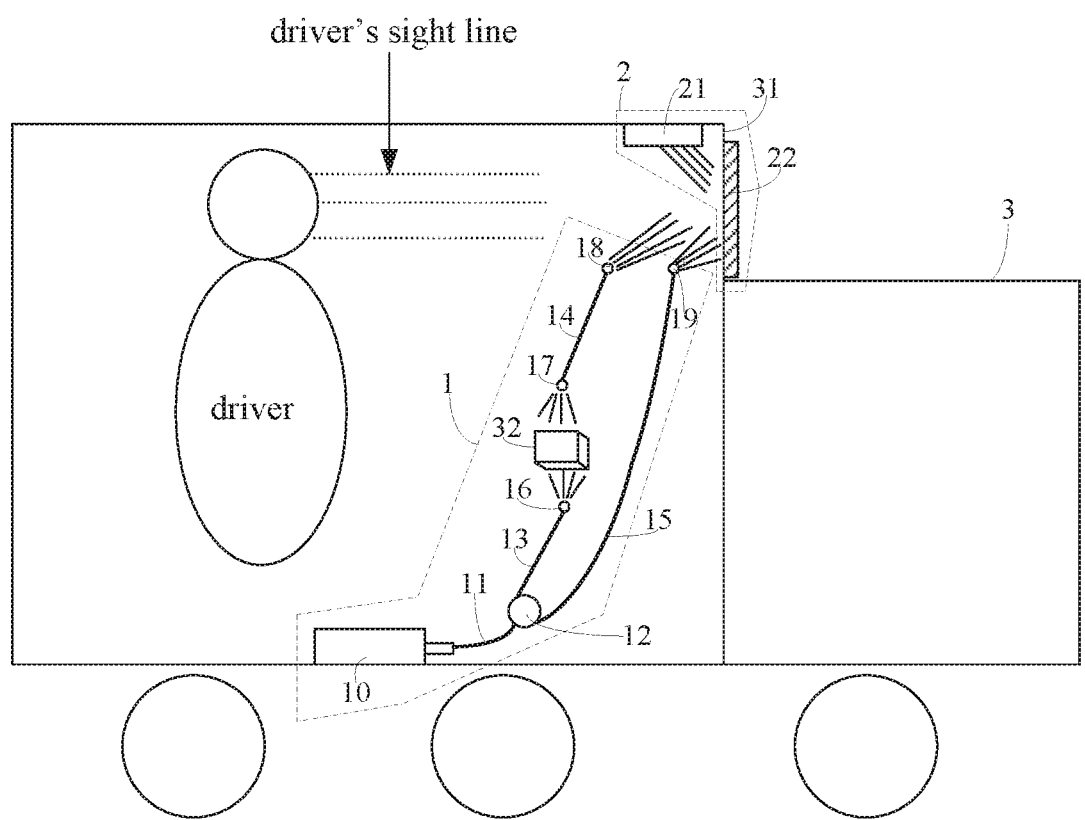

IN-VEHICLE DISPLAY SYSTEM AND VEHICLE

CROSS-REFERENCE TO RELATED APPLICATION

The present application claims priority from China patent application No. 201811068861.8 filed with the China National Intellectual Property Administration on Sep. 13, 2018, the disclosure of which is incorporated herein by reference in its entirety.

TECHNICAL FIELD

The present disclosure relates to a technical field of display technology, and particularly relates to an in-vehicle display system and a vehicle.

BACKGROUND

The vehicle head-up display technology (HUD) presents vehicle driving information in front of a driver so that the driver does not need to look down at the dashboard. There is currently such an implementation: using a mobile app (e.g., Gaode map, Baidu map) to diagnose a driving state of the vehicle, displaying the driving state information of the vehicle on the mobile phone, placing the mobile phone under the front windshield, and presenting the driving state information of the vehicle on the front windshield by reflecting a display image of the mobile phone by the front windshield.

SUMMARY

The present disclosure has been accomplished in order to at least partially solve the problems in the related art. The present disclosure provides an in-vehicle display system and a vehicle.

According to an aspect of the present disclosure, there is provided an in-vehicle display system including an optical fiber holographic projection portion and a holographic image display portion, the optical fiber holographic projection portion being configured to holographically project image information of a vehicle component onto the holographic image display portion, and the holographic image display portion being configured to present an original image of the vehicle component.

In some embodiments, the optical fiber holographic projection portion includes:

a first light source configured to generate light; and an optical fiber assembly optically coupled to the first light source and configured to transmit the light, split the light into a detection light and a reference light, transmit and illuminate the detection light onto the vehicle component, transmit and illuminate the detection light reflected by the vehicle component onto the holographic image display portion, and directly transmit and illuminate the reference light onto the holographic image display portion, wherein the reference light and the detection light illuminated onto the holographic image display portion form a holographic picture of the vehicle component.

In some embodiments, the optical fiber assembly includes a first optical fiber subassembly that includes a transmission optical fiber and an optical fiber beam splitter, the transmission optical fiber configured to transmit the light emitted from the first light source to the optical fiber beam splitter is optically coupled to the first light source at one end, and connected to the optical fiber beam splitter at the other end, and the optical fiber beam splitter is configured to split the light emitted from the first light source into the detection light and the reference light.

In some embodiments, the optical fiber assembly further includes a second optical fiber subassembly that includes a first detection optical fiber, a second detection optical fiber, a first optical fiber beam expander, a second optical fiber beam expander, and a third optical fiber beam expander, the first detection optical fiber configured to transmit the detection light is connected to the optical fiber beam splitter at one end, and connected to the first optical fiber beam expander at the other end, the first optical fiber beam expander is arranged opposite the vehicle component and illuminates the detection light onto the vehicle component, the second optical fiber beam expander is arranged opposite the vehicle component and receives the detection light reflected by the vehicle component, the second detection optical fiber configured to transmit the reflected detection light is connected to the second optical fiber beam expander at one end, and connected to the third optical fiber beam expander at the other end, and the third optical fiber beam expander is arranged opposite the holographic image display portion, and illuminates the reflected detection light onto the holographic image display portion.

In some embodiments, the optical fiber assembly further includes a third optical fiber subassembly that includes a reference optical fiber and a fourth optical fiber beam expander, the reference optical fiber configured to transmit the reference light is connected to the optical fiber beam splitter at one end, and connected to the fourth optical fiber beam expander at the other end, and the fourth optical fiber beam expander is arranged opposite the holographic image display portion, and illuminates the reference light onto the holographic image display portion.

In some embodiments, the first light source is a laser source.

In some embodiments, the first light source and the optical fiber beam splitter are disposed within the vehicle component, and the first detection optical fiber, the second detection optical fiber and the reference optical fiber are routed along circuit traces inside the vehicle component.

In some embodiments, the first light source and the optical fiber beam splitter are disposed within a cabin wall of the vehicle, and the first detection optical fiber, the second detection optical fiber and the reference optical fiber are routed along the cabin wall of the vehicle.

In some embodiments, the holographic image display portion includes a holographic image restoration unit and a holographic film, the holographic film is attached to a front windshield of the vehicle, and the holographic image restoration unit is configured to generate a restoration light and illuminate the restoration light onto the holographic film to restore the holographic picture to the original image of the vehicle component.

In some embodiments, the holographic image restoration unit includes a second light source opposite the holographic film and configured to emit the restoration light.

In some embodiments, the second source is a white light source.

In some embodiments, the second light source is disposed at a position adjacent to a top of the front windshield.

In some embodiments, the second light source is disposed at a position adjacent to a bottom of the front windshield.

In some embodiments, the holographic film is attached to the bottom of the front windshield so that a driver's sight line with respect to the holographic film is projected onto the hood.

In some embodiments, a light exit of the first optical fiber beam expander is disposed on a steering wheel operating lever.

In some embodiments, the third optical fiber beam expander and the fourth optical fiber beam expander are disposed below the front windshield and above the vehicle component.

According to another aspect of the present disclosure, there is provided a vehicle including a vehicle component and the above described in-vehicle display system, the vehicle component being a dashboard or an in-vehicle diagnosis system.

BRIEF DESCRIPTION OF DRAWINGS

FIG. 1 is a schematic structural view illustrating an in-vehicle display system according to an exemplary embodiment of the present disclosure.

DETAILED DESCRIPTION

To improve understanding of the technical solution of the present disclosure for those skilled in the art, the in-vehicle display system and the vehicle provided by the present disclosure will now be described in detail in conjunction with accompanying drawings and exemplary embodiments.

According to an aspect of the present disclosure, there is provided an in-vehicle display system. As shown in FIG. 1, the in-vehicle display system includes an optical fiber holographic projection portion 1 (see the dotted line frame (excluding a vehicle component 32) at the lower left of FIG. 1) and a holographic image display portion 2 (see the dotted line frame at the upper right of FIG. 1). The optical fiber holographic projection portion 1 is disposed in a vehicle 3, and the holographic image display portion 2 is disposed at or adjacent to a front windshield 31 of the vehicle 3. The optical fiber holographic projection portion 1 is configured to holographically project image information of the vehicle component 32 onto the holographic image display portion 2, and the holographic image display portion 2 is configured to present an original image of the vehicle component 32.

In an exemplary embodiment of the present disclosure, the vehicle component 32 may be, for example, a dashboard or an in-vehicle diagnosis system. The principle of holographic projection of the image information of the vehicle component 32 by the optical fiber holographic projection portion 1 and the holographic image display portion 2 is to record and reproduce a true three-dimensional image of an object based on the interference and diffraction principles, and transmit light in the holographic projection process through optical fibers.

In an exemplary embodiment of the present disclosure, as shown in FIG. 1, the optical fiber holographic projection portion 1 includes a first light source 10 and an optical fiber assembly (i.e., the rest portions of the optical fiber holographic projection portion 1 other than the first light source 10). The first light source 10 is configured to generate light. The optical fiber assembly is optically coupled to the first light source 10 and configured to transmit the light, split the light into a detection light and a reference light, transmit and illuminate the detection light onto the vehicle component 32, transmit and illuminate the detection light reflected by the vehicle component 32 onto the holographic image display portion 2, and directly transmit and illuminate the reference light onto the holographic image display portion 2. The reference light and the detection light illuminated onto the holographic image display portion 2 form a holographic picture of the vehicle component 32.

In an exemplary embodiment of the present disclosure, as shown in FIG. 1, the optical fiber assembly includes a first optical fiber subassembly that includes a transmission optical fiber 11 and an optical fiber beam splitter 12. The transmission optical fiber 11 is optically coupled to the first light source 10 at one end, and connected to the optical fiber beam splitter 12 at the other end. The transmission optical fiber is 11 is configured to transmit the light emitted from the first light source 10 to the optical fiber beam splitter 12. The optical fiber beam splitter 12 is configured to split the light emitted from the first light source 10 into the detection light and the reference light.

In an exemplary embodiment of the present disclosure, as shown in FIG. 1, the optical fiber assembly further includes a second optical fiber subassembly that includes a first detection optical fiber 13, a second detection optical fiber 14, a first optical fiber beam expander 16, a second optical fiber beam expander 17, and a third optical fiber beam expander 18. The first detection optical fiber 13 configured to transmit the detection light is connected to the optical fiber beam splitter 12 at one end, and connected to the first optical fiber beam expander 16 at the other end. The first optical fiber beam expander 16 is arranged opposite the vehicle component 32 and illuminates the detection light onto the vehicle component 32. The second optical fiber beam expander 17 is arranged opposite the vehicle component 32 and receives the detection light reflected by the vehicle component 32. The second detection optical fiber 14 configured to transmit the reflected detection light is connected to the second optical fiber beam expander 17 at one end, and connected to the third optical fiber beam expander 18 at the other end. The third optical fiber beam expander 18 is arranged opposite the holographic image display portion 2, and illuminates the reflected detection light onto the holographic image display portion 2.

In an exemplary embodiment of the present disclosure, as shown in FIG. 1, the optical fiber assembly further includes a third optical fiber subassembly that includes a reference optical fiber 15 and a fourth optical fiber beam expander 19. The reference optical fiber 15 configured to transmit the reference light is connected to the optical fiber beam splitter 12 at one end, and connected to the fourth optical fiber beam expander 19 at the other end. The fourth optical fiber beam expander 19 is arranged opposite the holographic image display portion 2, and illuminates the reference light onto the holographic image display portion 2.

As described above, in the optical fiber holographic projection portion 1, the first light source 10 generates light, and the first optical fiber subassembly is optically coupled to the first light source 10, and transmits and splits the light generated by the first light source 10 into the detection light and the reference light. The second optical fiber subassembly and the third optical fiber subassembly are connected to the first optical fiber subassembly in parallel, the second optical fiber subassembly transmits the detection light for detecting the vehicle component 32, and the third optical fiber subassembly transmits the reference light. With such configuration, the optical fiber holographic projection portion 1 can realize holographic projection of the vehicle component 32.

It should be understood that in a variation of the in-vehicle display system shown in FIG. 1, the first optical fiber subassembly may be omitted, i.e., the transmission optical fiber 11 and the optical fiber beam splitter 12 may be omitted. In this case, the second optical fiber subassembly and the third optical fiber subassembly are directly optically coupled to the first light source 10, respectively so that the first detection optical fiber 13 and the reference optical fiber 15 are directly optically coupled to the first light source 10, respectively. It should also be understood that a dimming component may be provided between the first light source 10 and the optical fiber assembly (e.g., between the first light source 10 and the first optical fiber subassembly or the first detection optical fiber 13 or the reference optical fiber 15) to adjust a characteristic quantity, such as a distribution ratio between the detection light and the reference light, a wavelength, or the like, of the light output from the first light source 10.

In an exemplary embodiment of the present disclosure, the first light source 10 is a laser source. Since the holographic projection is based on the principle of interference of light, it is required that the light source has good coherence. Laser has good spatial coherence and temporal coherence, and may be used to capture smaller diffuse objects to obtain a good holographic picture.

In an exemplary embodiment of the present disclosure, the first light source 10 and the optical fiber beam splitter 12 are disposed within the vehicle component 32. The first detection optical fiber 13, the second detection optical fiber 14 and the reference optical fiber 15 are routed along circuit traces inside the vehicle component 32 to achieve a smaller footprint.

It should be noted that the first light source 10 and the optical fiber beam splitter 12 may also be disposed within a cabin wall of the vehicle 3. The first detection optical fiber 13, the second detection optical fiber 14 and the reference optical fiber 15 are routed along the cabin wall of the vehicle. In this way, the footprint of the optical fiber holographic projection portion 1 may be further reduced.

The holographic image display portion 2 includes a holographic image restoration unit 21 and a holographic film 22. The holographic film 22 is attached to the front windshield 31 of the vehicle 3, for example, as shown in FIG. 1, attached to a position of the front windshield 31 corresponding to a height of the driver's eyes so that head-up display of the image information of the vehicle component 32 is achieved. The holographic image restoration unit 21 is configured to generate a restoration light and illuminate the restoration light onto the holographic film 22 to restore the holographic picture to the original image of the vehicle component 32.

It should be noted that the holographic film 22 may be attached to a side of the front windshield 31 facing an inside the vehicle 3 or may be attached to a side of the front windshield 31 facing an outside of the vehicle 3. The holographic film 22 is a transparent film material so that the setting of the holographic film 22 will not affect the driver's driving sight line while realizing the head-up display of the image information of the vehicle component 32.

In an exemplary embodiment of the present disclosure, a first step in realizing the head-up display of the image information of the vehicle component 32 in the vehicle 3 based on the holographic projection principle is: recording light wave information of the image information of the vehicle component 32 based on the interference principle, i.e., the photographing process: the vehicle component 32 forms a diffused object beam under illumination by the detection light; the reference light is illuminated onto the holographic film 22, and superimposed with the object beam to generate interference, and a phase and an amplitude of each point on the light wave of the vehicle component 32 are converted into spatially varying intensity so that all the information of the light wave of the vehicle component 32 is recorded utilizing contrast and intervals between interference fringes. The holographic film 22 on which the interference fringes are recorded forms a holographic picture of the vehicle component 32. A second step in realizing the head-up display of the image information of the vehicle component 32 in the vehicle 3 based on the holographic projection principle is: reproducing the light wave information of the vehicle component 32 based on the diffraction principle, i.e., the imaging process: the holographic picture is like a complex grating, and under the illumination of coherent restoration light, a diffracted light wave of a linearly recorded sinusoidal holographic picture generally gives two images, i.e., the original picture (also called the initial picture) and the conjugate picture. The reproduced original image (including the original picture and the conjugate picture) of the vehicle component 32 has a strong stereoscopic effect and a real visual effect.

In an exemplary embodiment of the present disclosure, the holographic image restoration unit 21 includes a second light source opposite the holographic film 22 and configured to emit the restoration light. The holographic picture includes interference fringes of the detection light and the reference light, and is a complex grating. The holographic picture is re-illuminated by a beam of restoration light of the same wavelength as the light when the picture is captured, and the restoration light is diffracted by the holographic picture, followed by a series of diffracted waves of a zero order, a first order, a second order and the like. There are two first-order diffracted waves, i.e., the original picture (also called the initial picture) and the conjugate picture. The reproduced original image (including the original picture and the conjugate picture) of the vehicle component 32 has a strong stereoscopic effect and a real visual effect.

In an exemplary embodiment of the present disclosure, the second source is a white light source. The white light may restore the holographic picture since it includes visible light of various wavelengths.

In an exemplary embodiment of the present disclosure, the second light source is disposed at a position adjacent to a top of the front windshield 31. In this way, the second light source will not affect the driver's sight line, and at the same time, the footprint of the holographic image display portion 2 may be further reduced. The second light source may be located on a side of the front windshield 31 facing an inside of the vehicle 3 or may be located on a side of the front windshield 31 facing an outside of the vehicle 3. However, in order to protect the second light source from interference with the external environment of the vehicle, it is ideal that the second light source is located on the side of the front windshield 31 facing the inside of the vehicle 3.

It should be noted that the second light source may also be disposed at a position adjacent to a bottom of the front windshield 31. In this case, the holographic film 22 may also be attached to the bottom of the front windshield 31 so that the driver's sight line with respect to the holographic film 22 is projected on the hood. That is, when the driver is watching information such as the driving state information of the vehicle on the holographic film 22, the background is the hood. This configuration enables that the second light source will not affect the driver's sight line at all, and at the same time, the footprint of the holographic image display portion 2 may be further reduced.

In addition, a light exit of the first optical fiber beam expander 16 may be disposed on a steering wheel operating lever and may be adjustable in position, so as to ensure that the detection light emitted from the first optical fiber beam expander 16 is illuminated onto the vehicle component 32. The third optical fiber beam expander 18 and the fourth optical fiber beam expander 19 may be disposed below the front windshield 31 and above a cover of the vehicle component 32, such as a dashboard, thereby securing that the detection light emitted from the third optical fiber beam expander 18 and the reference light emitted from the fourth optical fiber beam expander 19 are illuminated onto the holographic film 22 and produces interference. In this way, the footprint of the optical fiber holographic projection portion 1 may be further reduced.

The in-vehicle display system provided by the present disclosure realizes vehicle head-up display by using the optical fiber holographic projection so that the original image of the vehicle component displayed on the front windshield of the vehicle is clearer and more realistic. Further, since optical fibers have a strong anti-interference ability, a smaller footprint and low cost, the image displayed by the in-vehicle display system is more stable, and the system occupies a smaller footprint in the vehicle and is low in cost.

According to another aspect of the present disclosure, there is provided a vehicle including a vehicle component and the above described in-vehicle display system, wherein the vehicle component may be a dashboard or an in-vehicle diagnosis system.

By adopting the in-vehicle display system described above, not only the head-up display of the vehicle is realized, but also the image in the head-up display is clearer and more realistic and stable, thereby improving the head-up display effect of the vehicle and reducing the cost of the head-up display of the vehicle.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. An in-vehicle display system comprising an optical fiber holographic projection portion and a holographic image display portion, the optical fiber holographic projection portion being configured to holographically project image information of a vehicle component onto the holographic image display portion, and the holographic image display portion being configured to present an original image of the vehicle component, wherein
the optical fiber holographic projection portion comprises:
a first light source configured to generate light; and
an optical fiber assembly optically coupled to the first light source and configured to transmit the light, split the light into a detection light and a reference light, transmit and illuminate the detection light onto the vehicle component, transmit and illuminate the detection light reflected by the vehicle component onto the holographic image display portion, and directly transmit and illuminate the reference light onto the holographic image display portion, wherein the reference light and the detection light illuminated onto the holographic image display portion form a holographic picture of the vehicle component, wherein
the optical fiber assembly includes a first optical fiber subassembly that includes a transmission optical fiber and an optical fiber beam splitter,
the transmission optical fiber configured to transmit the light emitted from the first light source to the optical fiber beam splitter is optically coupled to the first light source at one end, and connected to the optical fiber beam splitter at the other end, and
the optical fiber beam splitter is configured to split the light emitted from the first light source into the detection light and the reference light, and wherein
the optical fiber assembly further includes a second optical fiber subassembly that includes a first detection optical fiber, a second detection optical fiber, a first optical fiber beam expander, a second optical fiber beam expander, and a third optical fiber beam expander,
the first detection optical fiber configured to transmit the detection light is connected to the optical fiber beam splitter at one end, and connected to the first optical fiber beam expander at the other end,
the first optical fiber beam expander is arranged opposite the vehicle component and illuminates the detection light onto the vehicle component,
the second optical fiber beam expander is arranged opposite the vehicle component and receives the detection light reflected by the vehicle component,
the second detection optical fiber configured to transmit the reflected detection light is connected to the second optical fiber beam expander at one end, and connected to the third optical fiber beam expander at the other end, and
the third optical fiber beam expander is arranged opposite the holographic image display portion, and illuminates the reflected detection light onto the holographic image display portion.

2. The in-vehicle display system according to claim 1, wherein
the optical fiber assembly further includes a third optical fiber subassembly that includes a reference optical fiber and a fourth optical fiber beam expander,
the reference optical fiber configured to transmit the reference light is connected to the optical fiber beam splitter at one end, and connected to the fourth optical fiber beam expander at the other end, and
the fourth optical fiber beam expander is arranged opposite the holographic image display portion, and illuminates the reference light onto the holographic image display portion.

3. The in-vehicle display system according to claim 2, wherein
the first light source and the optical fiber beam splitter are disposed within the vehicle component, and the first detection optical fiber, the second detection optical fiber and the reference optical fiber are routed along circuit traces inside the vehicle component.

4. The in-vehicle display system according to claim 2, wherein
the first light source and the optical fiber beam splitter are disposed within a cabin wall of the vehicle, and the first detection optical fiber, the second detection optical fiber and the reference optical fiber are routed along the cabin wall of the vehicle.

5. The in-vehicle display system according to claim 2, wherein
the third optical fiber beam expander and the fourth optical fiber beam expander are disposed below the front windshield and above the vehicle component.

6. The in-vehicle display system according to claim 1, wherein
the first light source is a laser source.

7. The in-vehicle display system according to claim 1, wherein
the holographic image display portion includes a holographic image restoration unit and a holographic film, the holographic film is attached to a front windshield of the vehicle, and the holographic image restoration unit is configured to generate a restoration light and illuminate the restoration light onto the holographic film to restore the holographic picture to the original image of the vehicle component.

8. The in-vehicle display system according to claim 7, wherein
the holographic image restoration unit includes a second light source opposite the holographic film and configured to emit the restoration light.

9. The in-vehicle display system according to claim 8, wherein
the second source is a white light source.

10. The in-vehicle display system according to claim 8, wherein
the second light source is disposed at a position adjacent to a top of the front windshield.

11. The in-vehicle display system according to claim 8, wherein
the second light source is disposed at a position adjacent to a bottom of the front windshield.

12. The in-vehicle display system according to claim 11, wherein
the holographic film is attached to the bottom of the front windshield so that a driver's sight line with respect to the holographic film is projected onto the hood.

13. The in-vehicle display system according to claim 1, wherein
a light exit of the first optical fiber beam expander is disposed on a steering wheel operating lever.

14. A vehicle comprising a vehicle component and the in-vehicle display system according to claim 1, the vehicle component being a dashboard or an in-vehicle diagnosis system.

\* \* \* \* \*